United States Patent Office 3,579,415
Patented May 18, 1971

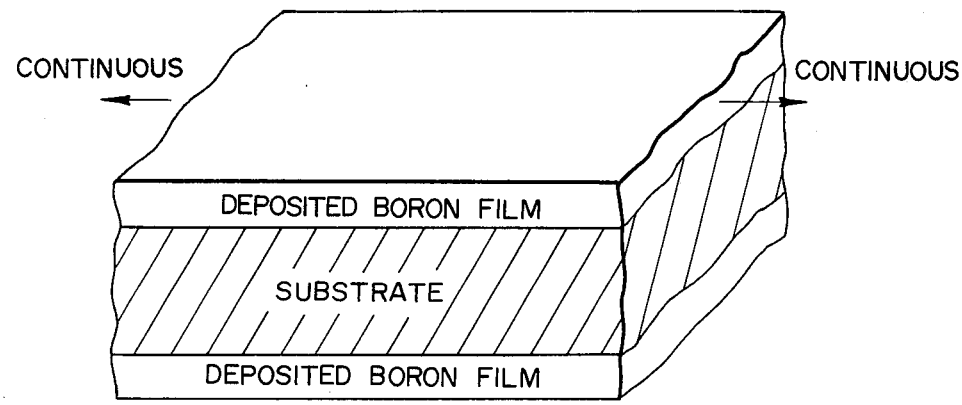
FIG. IA
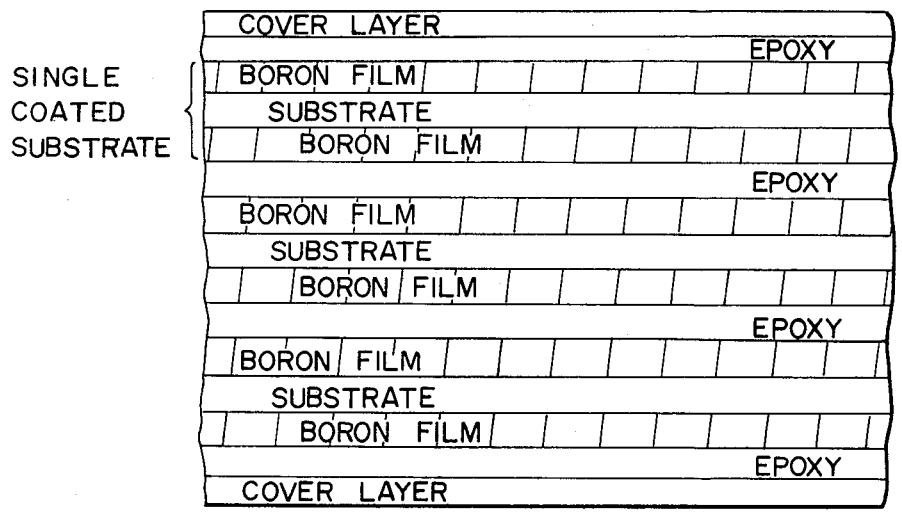
FIG. IB

3,579,415
STRUCTURAL LAMINATES
Lloyd R. Allen, Belmont, Norman Beecher, Concord, Frank Feakes, Lexington, and James F. Springfield, Reading, Mass., assignors to National Research Corporation, Newton Highlands, Mass.
Filed June 29, 1967, Ser. No. 650,103
Int. Cl. B32b 15/04; C23c 13/0, 13/04
U.S. Cl. 161—184                                1 Claim

ABSTRACT OF THE DISCLOSURE

Lightweight structures of high specific modulus and specific strength (modulus of elasticity and ultimate strength, respectively, divided by density) can be achieved by structural laminates comprising rigid materials characterized by brittleness and high stiffness formed as films and laid up in laminates. The adjacent films of the laminates are secured to each other by adhesives or hot pressed self bonding. The liminates offer a significant advantage over the prior art filament and fiber reinforced composite systems in that the laminates offer their strength and rigidly in all directions in the plane of the laminate.

---

Key words: Laminates, composites structures, vacuum deposition, boron, boron carbide, carbon laminates.

PUBLICATIONS DISCUSSED BELOW (1) Air Force Materials Laboratory—Wright Patterson Air Force Base, Ohio, "Advanced Filaments and Composites Review Meeting." Dec. 6, 1965
(2) Alexander "Inner Strength for Man's Materials," Fortune, April 1966 (pp. 152–155, 178–184)
(3) Allen Ser. No. 524,615 filed Feb. 1, 1966, now abandoned
(4) Allen Ser. No. 524,962 filed Jan. 26, 1966, now U.S. Pat. 3,414,655
(5) Bradstreet, Defense Documentation Center, Cameron Station, Bldg. 5, 5010 Duke St., Arlington, Va., ML TDR 64–85 May 1964
(6) Griffith Proceedings of/Int'l Cong. Applied Mechanics, 1924
(7) Grinius, AFML–TR–66–177, September 1966
(8) Herring, SAMPE Journal, November 1966
(9) Jaffe, Society of Plastics Industries, February 1966
(10) Knapp et al., U.S. Pat. 3,089,196, May 14, 1963
(11) Krock, Science and Technology, November 1966
(12) Mullen, Research/Development Magazine, September 1965
(13) Rabinowicz U.S. Pat. 3,124,428, Mar. 10, 1964

DEFINITIONS OF TERMS USED HEREIN

"Rigid" or "brittle" materials refers to materials having an elongation of 3–4% or less at tensile failure. Some examples are boron, boron carbide, carbon, glass, alumina, silicon carbide, aluminum oxide, silicon nitride. "Films" refers to films of materials in the thickness range on the order of about one mil but sufficiently thick to be coherent as on the order of 0.1 mil. The only prior usage of the films of brittle material in any art is in the electronics industry where the term films implies a thickness on the order of hundredths of a mil. Unless otherwise specified here, the film may be self supporting or in the form of a coating on a substrate. "Amorphous" means apparently amorphous to X-ray examination or with crystal size below 1000 angstrom units.

DESCRIPTION

The present invention relates to structural composites. Composite materials have been used at least since the beginning of the Bronze Age. A common example of "composites" in the broad sense is reinforced concrete. In World War II a significant new departure in materials technology occurred with the advent of glass fibers embedded in a plastic matrix. In the next 20 years several important variations evolved, one of the most significant being boron fiber reinforced plastics. General Bernard Schriever of the Air Force Systems Command said of the boron development "In the materials area . . . we are on the threshold of the greatest single advance that has been made in the last three thousand years." Alexander and Mullen, supra, give a good description of the history of the developments and the extraordinary scope of effort now devoted to these high strength composites in some 100 laboratories in the U.S. and Europe. Jaffe, Krock and the Air Force Materials Lab Report show the limits of the state of the art materials. Griffith gives the fundamental analysis of the mechanics of crack propagation and biaxial stresses.

The present invention sets forth a new form of composite in the form of film laminates, similar in configuration to plywood.

It is the object of the present invention to provide a new structural material characterized by high specific strength and specific modulus, demonstrating planar isotropic properties so that the high strength and modulus properties are not limited to selected orientations as in fiber reinforced composites.

The object is achieved by vacuum coating a high strength rigid material on a substrate to form a coherent thin film. The film is typically characterized by a thickness of between 0.1 and 1.0 mil and an amorphous structure. Such films are then fabricated into laminates either with their substrate or with removal of all or part of the substrate through etching. The laminate is formed with adhesives or by hot pressing with moderate heating. The invention is now described specifically with reference to the accompanying drawings wherein:

FIGS. 1A and 1B are diagrams of a laminate (FIG. 5A showing a component) according to a preferred embodiment of the invention;

We have fabricated several composites from boron films deposited on both aluminum and polyimide substrates (see FIGS. 1A and 1B for typical construction). Presented below are the results for eleven composites based on a polyimide substrate film which have been prepared. These were analyzed for boron content by physical and chemical methods, and mechanically tested, in some cases by more than one type of test for ultimate strength and modulus of elasticity.

Figure 2:
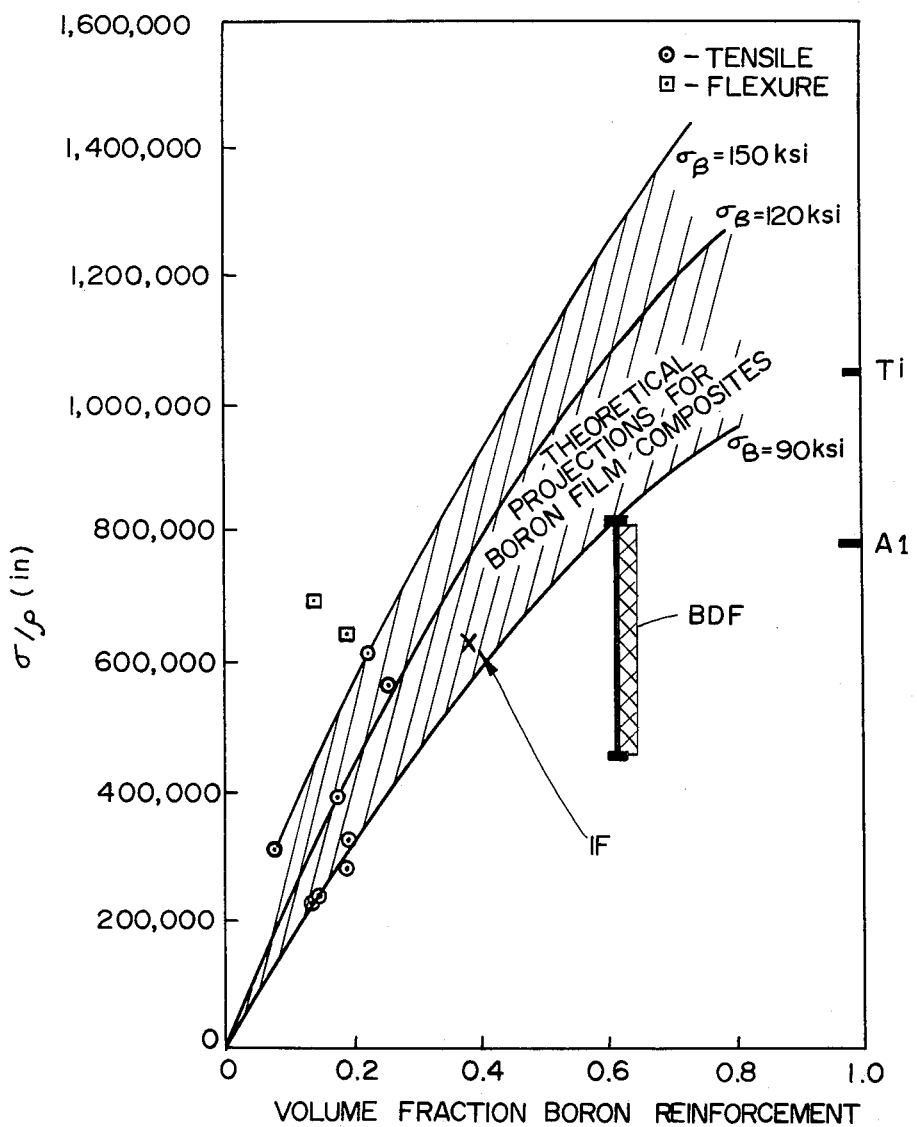
FIG. 2 is a specific strength vs. volume percent boron curve showing several test points for thin film laminates, extrapolated curves based on the law of mixtures and a comparison with prior art materials.
Figure 3:
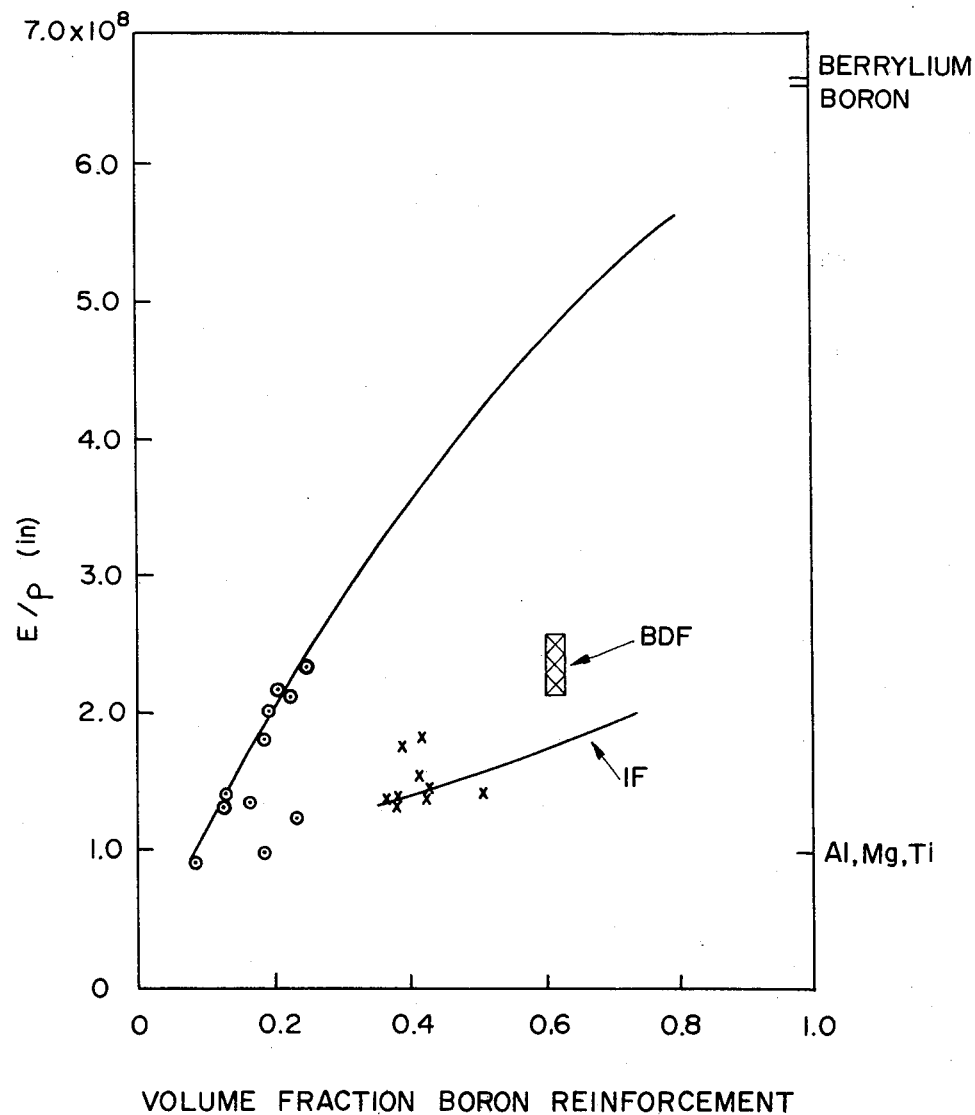
FIG. 3 is a similar curve for specific elastic modulus vs volume percent boron.

In FIG. 2 the strength-weight ratio, calculated from the data, is presented in terms of the volume fraction of boron film reinforcement. Also included are predicted values of the composite strength for different effective strengths of the boron film. These calculations suggest the direction which higher volume fractions of boron film will cause the composite strength to take. It has been found that these laminates obey the Law of Mixtures to a good approximation. Therefore, the shaded areas represent a legitimate projection of the data to higher volume fractions of boron. Even at about 20% reinforcement the specific strength of the boron is higher than that of presently available 60% reinforcement bidirectional boron filament composites indicated by the rectangle BDF. Specific strength of titanium (Ti) and aluminum (Al) are also shown.

Figure 4:
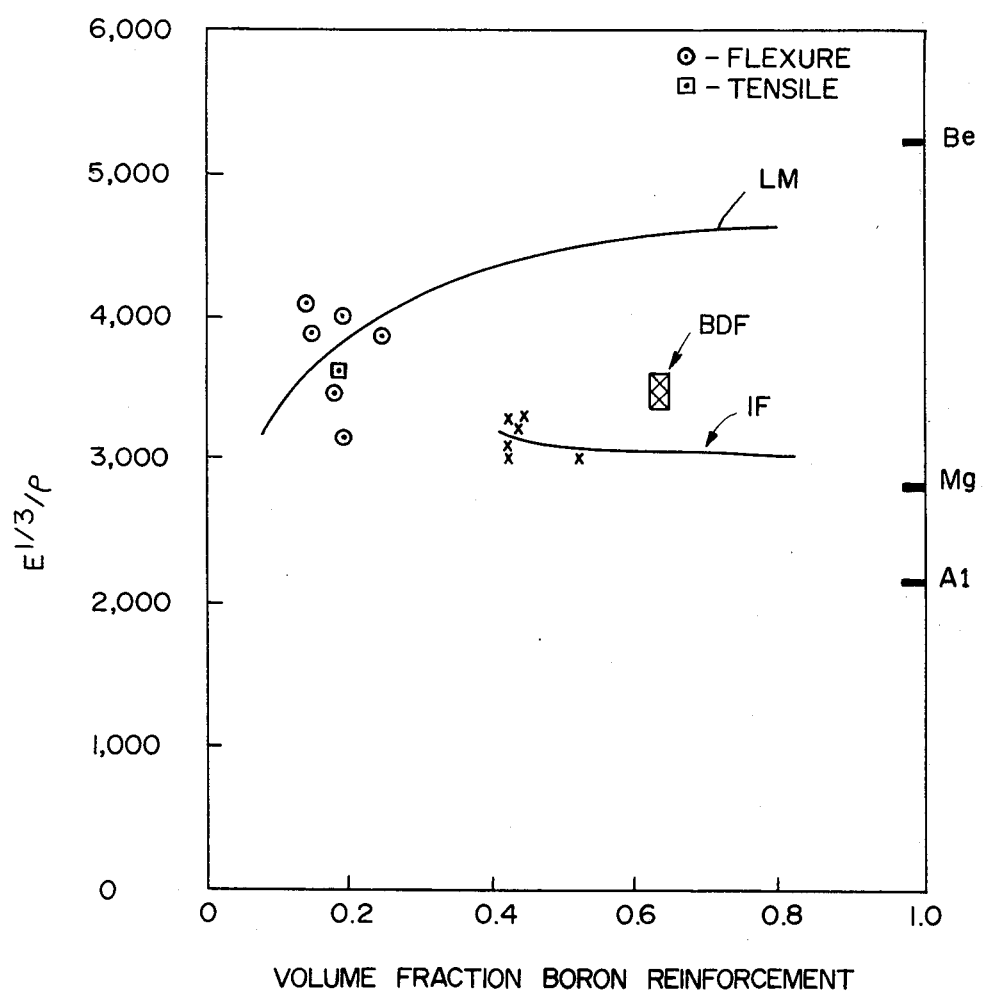
FIGS. 4 and 5 are similar curves for specific panel buckling efficiency vs. volume percent of boron, FIG. 4 illustrating panel buckling efficiency and FIG. 5 illustrating stiffened box or cylinder buckling efficiency per standard airframe industry criteria.

Values of the specific modules attainable by the present invention are shown in FIG. 4. Also shown are available data for isotropic (IF) and bidirectional boron filament composites (BDF) and reference data for aluminum (Al) and titanium (Ti). This gives the measure of stiffness of the materials for a given weight.

TABLE 1

| Specimen | Density, lb./cu. in. | Percent boron by volume | Elastic modulus, p.s.i. | | Ultimate strength, p.s.i. | |
|---|---|---|---|---|---|---|
| | | | Flexure | Tensile | Flexure | Tensile |
| 1 | .051 | 24.0 | 6.0×10$^6$ | | | 29,400 |
| 2 | .055 | 19.3 | 5.3 | 7.9×10$^6$ | 35,300 | 15,400 |
| 3 | .043 | 13.2 | 5.9 | | | 10,000 |
| 4 | .047 | 14.5 | 6.2 | | 33,000 | 11,200 |
| 5 | .055 | 17.7 | 7.2 | | | 22,000 |
| 6 | .051 | 19.4 | 9.0 | | | 16,500 |
| 7 | .051 | 23.4 | 10.7 | | | 13,300 |
| 8 | .058 | 25.6 | 13.4 | | | 17,400 |
| 9 | .053 | 20.1 | 11.0 | | | 20,000 |
| 10 | .052 | 9.4 | 4.5 | | | 15,200 |
| 11 | .052 | 22.2 | 10.9 | | | 32,400 |

Figure 5:
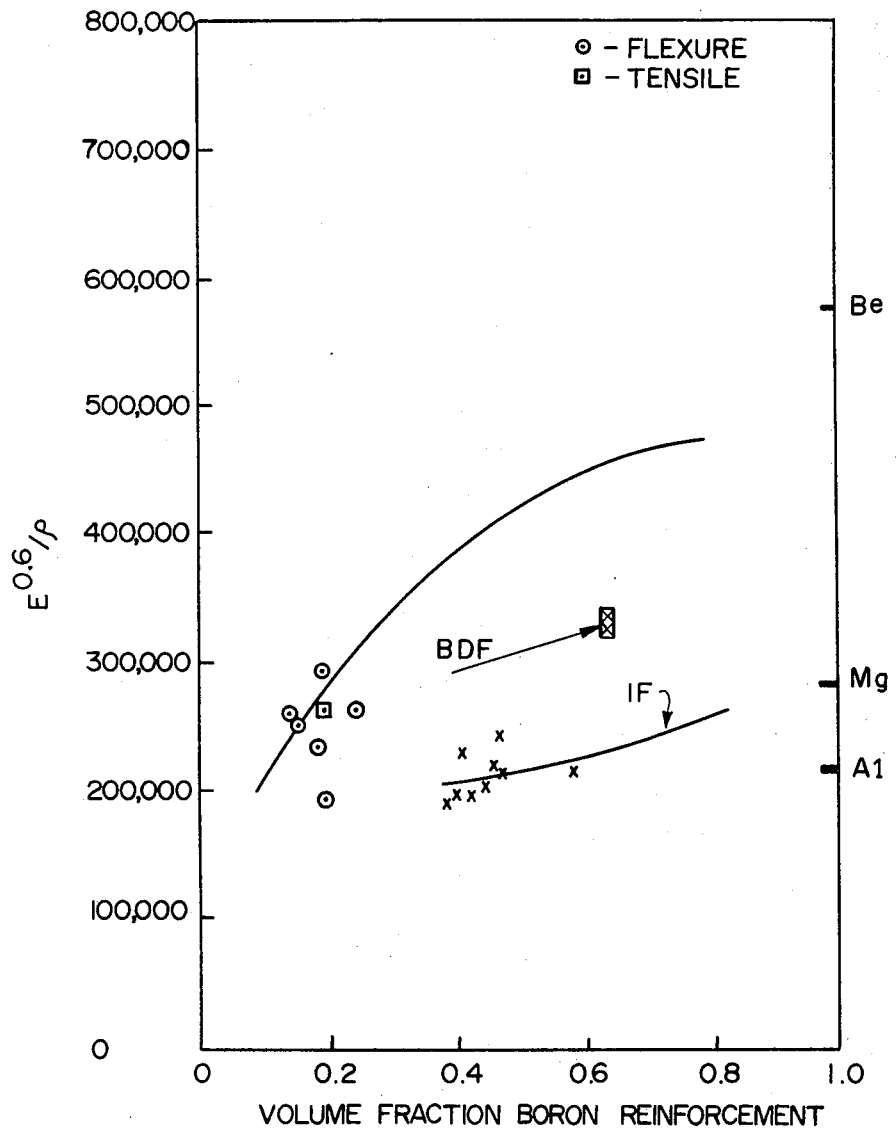

The results shown in FIG. 4 and FIG. 5 for the modulus-density parameters associated with the design of compressively loaded structures were calculated from the data of Table 1. These parameters give a measure of the weight efficiency when utilized in buckling sensitive design.

In order to be able to make a reasonable comparison of both the current status and future potential of film composites with those same aspects of isotropic boron filaments composites experimental results coupled with theoretical predictions of the performance are shown.

The method of making the films used in the laminates is illustrated by the following non-limiting examples.

Example 1

A polyimide plastic substrate of approximately half mil thickness was coated with electron beam evaporated boron as described in the Allen application Ser. No. 524,962, now U.S. Pat. No. 3,414,655. The coating conditions were—background pressure, 1×10$^{-6}$ torr; electron beam gun power, 15 kilowatts; coolant temperature, 138–152° C.; substrate speed, 0.22–0.40 feet per minute for a coating time of 55 minutes on one side and 47 minutes on the other side. An apparent total thickness of boron coating of 0.3–0.8 mil was produced. Rectangles of the coated substrate (4" x 6.5") were cut out and coated with an epoxy resin-catalyst mixture activated by atmospheric moisture as a curing agent. The resin was dissolved in acetone solvent. The solution covered rectangles were laid up in 16 plies and covered with 2 plies of clear polyimide. The laminate was pressed at 300° F. for 3 hours under a pressure of 538 p.s.i. The resultant was observed to be very rigid and strong.

The laminate was tested for elastic modulus in a flexure type test and the modulus was 6 million p.s.i. The laminate was tested for ultimate tensile strength and this was 29,400 p.s.i. The density of this laminate was .051 pound per cubic inch. The included volume percent of boron was 24%.

Example 2

A film laminate was prepared as in Example 1 but with the significant differences that 46 coated plies were incorporated in the laminate and that the volume percent of boron was 19.3%.

The elastic moduli for the laminate were:

(flexure)—5,300,000 p.s.i.
(tensile)—7,900,000 p.s.i.

The ultimate tensile strengths were:

(flexure)—35,300 p.s.i.
(tensile)—15,400 p.s.i.

The torsional modulus was 2,900,000 p.s.i. The density of the laminate was .055 pound per cubic inch.

The significance of the results epitomized in Examples 2 and 3 will be apparent from the curves of FIGS. 2 to 5.

The technology is presently available for making boron and boron carbide thin film laminates with volume percentages in excess of 50%. The additional advantage to be derived from such thicker film is illustrated in Table 2.

TABLE 2

| | Modulus (p.s.i.) | Ultimate tensile strength (p.s.i.) | Density (g./cc.) |
|---|---|---|---|
| Boron film laminate with 60% boron by volume | [1] 30×10$^6$ | 90,000 | 1.88 |
| Boron carbide film laminate with 60% boron carbide by volume | 36×10$^6$ | 90–100,000 | 2.02 |
| Prior art: | | | |
| Bi-directional boron fiber composite (64% boron by volume) | 23×10$^6$ | 67,000 | 2.15 |
| 3 directional boron fiber composite with 50% boron by volume | 11×10$^6$ | 41,000 | 1.9 |
| Aluminum alloy (100%) | 10×10$^6$ | 75,000 | 2.70 |
| Titanium (100%) | 15×10$^6$ | 140,000 | 4.50 |

[1] Approximate.

Dividing modulus and strength by density to get specific modulus and specific strength shows what a significant breakthrough in structural materials is represented by the present disclosure.

The rigid refractory material film thickness can be increased so that the film thickness exceeds the substrate thickness. In the case of boron it is preferred to achieve the desired 50% or more of boron by volume by decreasing the thickness of the substrate since films of boron are not formed as readily as boron carbide in dimensions say between 0.3 and 1.0 mil. In making both boron and boron carbide films, substantial film cracking occurs between 0.3 and 1.0 mil. However, an important feature of the invention resides in the recognition that the film laminates are useful even in cracked form.

In one variation of the method of the invention, the volume fraction of reinforcement is increased after coating. This involves coating boron on an aluminum substrate and removal of part or all of the substrate subsequent to deposition. For convenient handling aluminum substrates between 0.3 and 0.5 mil thickness have been used. In the partial removal process, boron is deposited on one surface of the substrate and the aluminum etched off with alkali leaving an aluminum thickness of 0.1–0.2 mil. The resulting material could be expected to have a 60 to 80 percent boron content and could be laid up in laminates with the addition of about 10 percent of epoxy resin adhesive. The contribution of the aluminum to the total weight would be small.

Figure 6:
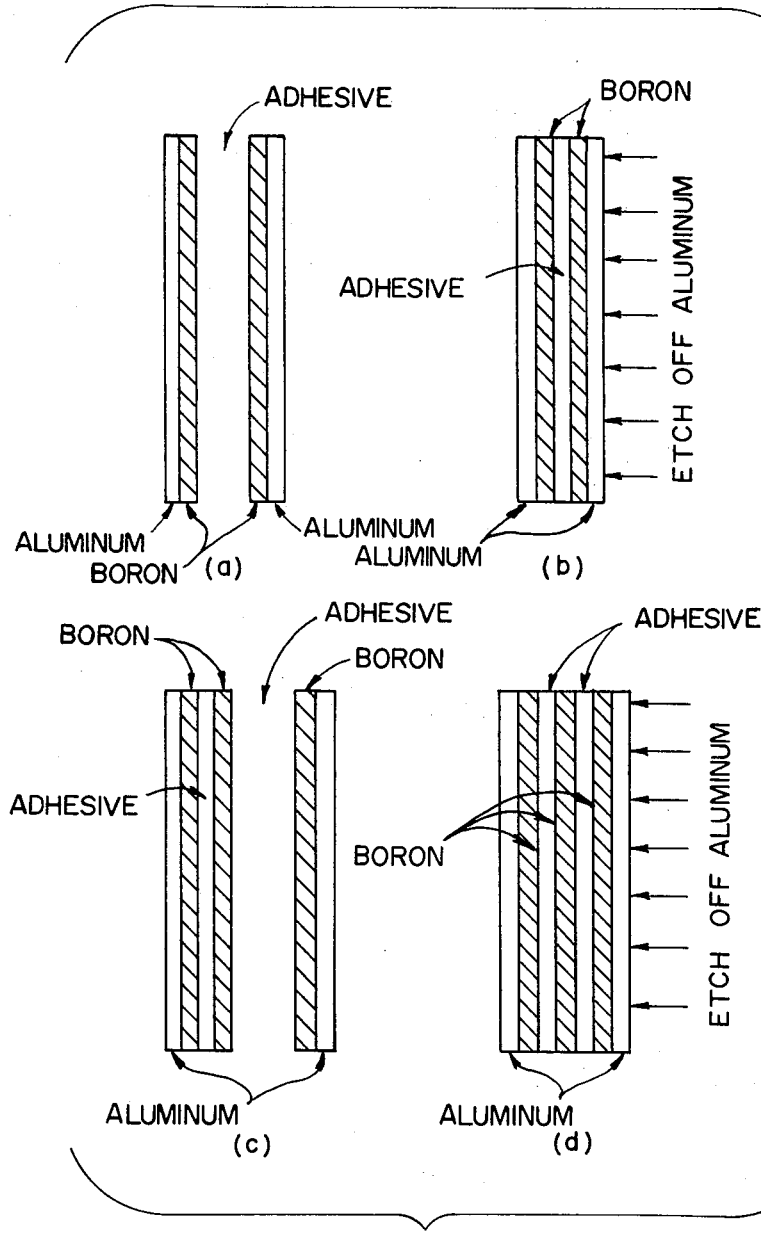
FIG. 6 is a diagram showing another species of the invention.

In a variation of the above process, boron (or other rigid material such as boron carbide) is deposited on one side of the aluminum as before. Two sheets of thin film reinforcement with the boron layers facing each other are then attached to each other with epoxy adhesive (see FIG. 6). This produces a sandwich with an external layer of aluminum on each side. One of these surface layers of aluminum is then etched off completely, leaving an exposed boron face. Another layer of thin film reinforcement is then attached to this boron face with the aluminum again outside. This outer layer of aluminum substrate is etched away as before. A third sheet of reinforcement is then attached and the process is repeated until a thick composite is built up.

In its broadest aspect, the invention comprises a structural laminate with at least 10% volume fraction of the reinforcing phase with a distinctly advantageous comparison to multi-directional filament reinforced structures based on the isotropic characteristic of the laminate at 20% volume fraction. At volume fractions of 40% and above and particularly at 50% and particularly at 60%, the laminate structures of the present invention also compare favorably with comparable multi-directional filament-reinforced laminates even with respect to favored directions of the filament structure.

Figure 7:
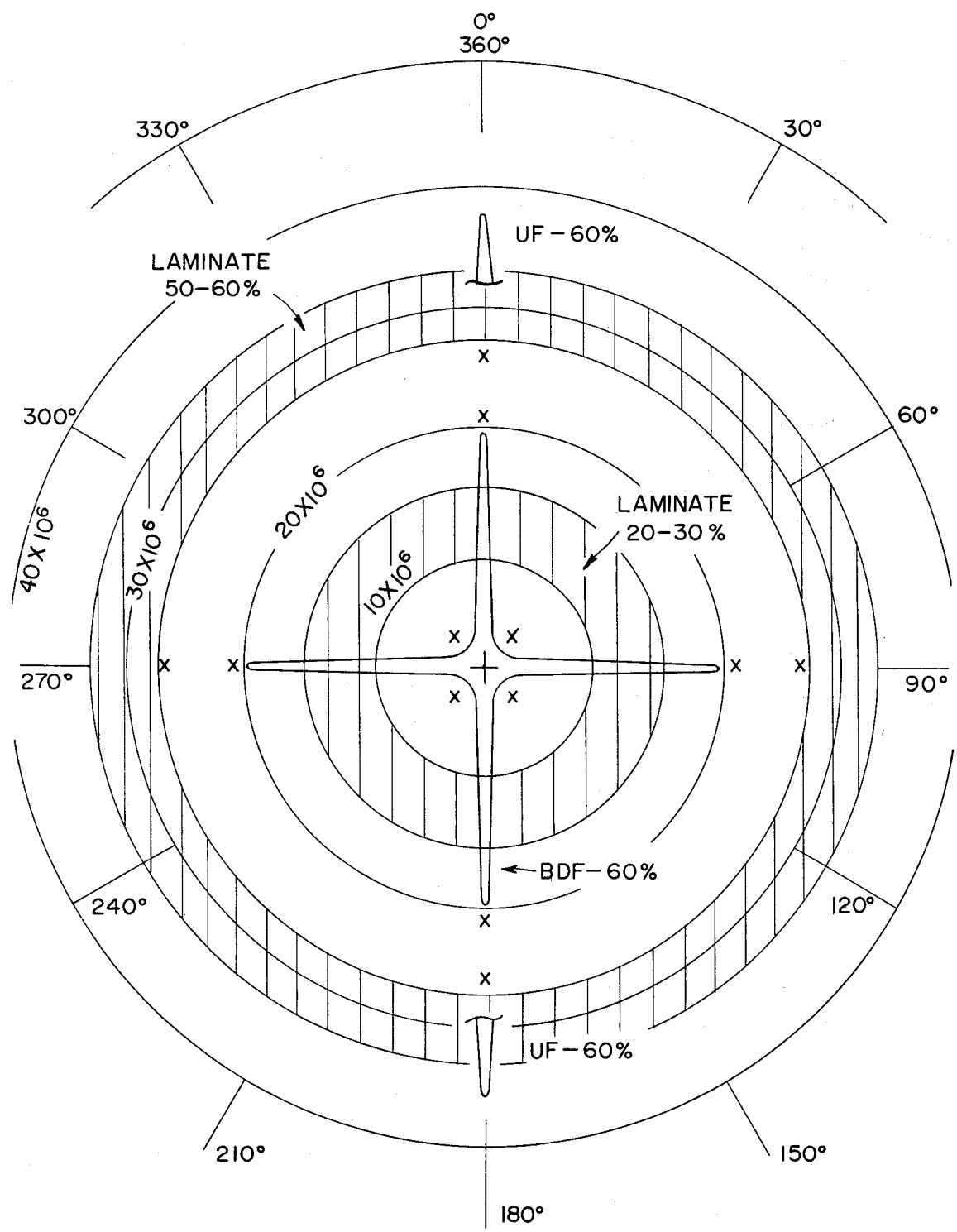
FIG. 7 is a polar plot of modulus of elasticity.

FIG. 7 illustrates the dramatic improvement afforded by the present invention as applied to boron in comparison with the prior art boron fiber reinforced composites. This graph is a polar plot of modulus of elasticity in p.s.i. with given values—$10 \times 10^6$, $20 \times 10^6$, etc., indicated at concentric rings. Vectors can be taken from the center of the plot in various directions from zero to 360 degrees to indicate the direction of applied stress. Modulus versus direction curves are plotted for two types of conventional fiber reinforced composites based on the data points marked on the graph. The two fiber composites are a unidirectionally aligned composite indicated at UF and a bidirectional composite indicated at BDF; both have 60% volume fraction of boron. The bidirectional composite BDF exhibits high modulus only in the 0, 90, 180, 270-degree directions. The unidirectional composite UF exhibits still higher modulus but only in the 0, 180-degree directions. The inner portion of the UF curve has been cut away for purposes of illustration, but if plotted, it would substantially overlap the 0, 180-degree portion of the BDF curve. In contrast the modulus of elasticity afforded by the present invention is indicated in shaded rings taken at 20-30% and 50-60% volume fraction of boron, respectively.

It will be apparent to those skilled in the art that many variations can be made within the scope of the present invention. For instance, laminates made essentially of vacuum deposited layers as described above could include some layers of fiber reinforced sheet or tape interspersed therewith to increase modulus or density in selected directions based on the orientation of the fibers in the fiber reinforced layers. It is therefore intended that the above disclosure shall be read as illustrative and not in a limiting sense.

What is claimed is:

1. A structural laminate comprising multiple thin layers made of an amorphous crystal-structure film of material selected from the group consisting of boron and boron carbide, each of the said amorphous crystal-structure film layers having been vacuum deposited as a coating on a polyimide substrate, with repeating units of coated substrate bonded together by intervening layers of epoxy material to form the laminate, the laminate providing essentially isotropic strength and modulus of elasticity in the plane of the laminate and in a magnitude corresponding essentially to the volume fraction of the coating material.

References Cited

UNITED STATES PATENTS

| | | | |
|---|---|---|---|
| 3,499,782 | 3/1970 | Shockley | 117—107X |
| 3,523,035 | 8/1970 | Whitlow | 117—107.2X |
| 3,499,785 | 3/1970 | Van Amstel | 117—107 |
| 2,858,451 | 10/1958 | Silversher | 250—108 |
| 3,466,224 | 9/1969 | Vaughn et al. | 161—213X |
| 3,476,529 | 11/1969 | Dubin et al. | 29—183.5 |
| 3,481,825 | 12/1969 | Darrow | 161—213X |
| 2,790,656 | 4/1957 | Cook | 29—197X |
| 3,043,715 | 7/1962 | Clough | 117—107.1 |
| 3,059,326 | 10/1962 | Jominy et al. | 29—197X |
| 3,089,196 | 5/1963 | Knapp et al. | 264—112 |
| 3,098,723 | 7/1963 | Micks | 29—183.5 |
| 3,165,864 | 1/1965 | Shulze | 161—182X |
| 3,306,764 | 2/1967 | Lewis et al. | 161—182X |
| 3,348,967 | 10/1967 | Hucke | 161—213X |
| 3,367,826 | 2/1968 | Heestand et al. | 161—182 |

HAROLD ANSHER, Primary Examiner

U.S. Cl. X.R.

29—182.8, 183.5, 195, 197; 117—107, 119; 161—182, 213